US012752398B2

(12) United States Patent
Green

(10) Patent No.: US 12,752,398 B2
(45) Date of Patent: Oct. 6, 2026

(54) ABRASIVE ARTICLES AND METHODS AND SYSTEMS FOR GENERATING AND USING THE SAME

(71) Applicant: Abrasive Technology, LLC, Lewis Center, OH (US)

(72) Inventor: Walter Brandt Green, Columbus, OH (US)

(73) Assignee: Abrasive Technology, LLC, Lewis Center, OH (US)

( * ) Notice: Subject to any disclaimer, the term of this patent is extended or adjusted under 35 U.S.C. 154(b) by 448 days.

(21) Appl. No.: 18/341,455

(22) Filed: Jun. 26, 2023

(65) Prior Publication Data

US 2024/0424642 A1 Dec. 26, 2024

(51) Int. Cl.
*B24D 11/00* (2006.01)
*C08J 9/40* (2006.01)

(52) U.S. Cl.
CPC ............ *B24D 11/00* (2013.01); *B24D 11/001* (2013.01); *C08J 9/40* (2013.01); *C08J 2205/05* (2013.01); *C08J 2379/02* (2013.01); *C08J 2393/02* (2013.01)

(58) Field of Classification Search
CPC .......... A47L 13/10; A47L 13/16; A47L 17/08; B24D 11/00; B24D 11/001; C08J 9/40
See application file for complete search history.

(56) References Cited

U.S. PATENT DOCUMENTS

2007/0157948 A1* 7/2007 Gonzales .................. C08J 9/42 134/6
2019/0104918 A1* 4/2019 Carlson .................. A47L 17/08

* cited by examiner

*Primary Examiner* — Pegah Parvini
(74) *Attorney, Agent, or Firm* — McDonnell Boehnen Hulbert & Berghoff LLP

(57) ABSTRACT

Example embodiments relate to methods and systems for generating and using abrasive articles. An abrasive article includes an open cell foam body and an abrasive composition disposed homogenously throughout the open cell foam body. The abrasive composition includes a resin and a plurality of abrasive particles, where each abrasive particle has a threshold hardness (e.g., a hardness of at least 6 on a Mohs scale). As such, the abrasive article has an effective grit that depends on a pressure applied to the article and can have a variable grit that depends on the properties of the open cell foam body and abrasive particles.

17 Claims, 4 Drawing Sheets

ABRASIVE ARTICLES AND METHODS AND SYSTEMS FOR GENERATING AND USING THE SAME

FIELD

The present disclosure relates generally to abrasive articles, and more particularly to methods and systems for generating and using abrasive articles.

BACKGROUND

Abrasive articles, such as pads, paper, sandpaper, etc., are commonly used to condition the surface of a variety of materials. Conditioning can provide a variety of finishes to the surface, such as a specific texture, roughness, or polish. Typically, when conditioning a surface, multiple non-woven single-grit abrasive materials are used upon the surface in a particular sequence to achieve the desired results due to the different abrasive properties that various abrasive materials offer. For example, when a user wishes to smooth out a particular surface, the user may initially apply a lower grit abrasive material upon the particular surface and then proceed to use a, medium grit abrasive material and then a higher grit abrasive material on the particular surface to achieve a final smooth surface.

Whether the surface conditioning is accomplished by hand or with a machine, switching abrasive articles during the conditioning process increases total production time, complexity, cost, and the quantity of abrasive articles required overall. As such, there exists a need for a more effective abrasive article.

SUMMARY

In one aspect, the present disclosure provides an example abrasive article. The abrasive article includes an open cell foam body and an abrasive composition, which is disposed homogenously throughout the open cell foam body. The abrasive composition includes a resin and a plurality of abrasive particles, where each abrasive particle has a hardness of at least 6 on a Mohs scale. The abrasive article has an effective grit that depends on a pressure applied to the abrasive article during use.

In another aspect, the present disclosure provides an example method of making an abrasive article. The method involves providing an open cell foam body and also providing a liquid comprising a solvent and an abrasive composition. The abrasive composition includes a resin and a plurality of abrasive particles, where each abrasive particle has a hardness of at least 6 on the Mohs scale. The method further involves contacting the open cell foam body with the liquid to provide a damp open cell foam body, applying a pressure across the open cell foam body, and allowing the liquid to dry by evaporation of the solvent to provide the abrasive article. The abrasive composition is disposed homogeneously throughout the open cell foam body and has an effective grit dependent on a pressure applied to the article.

In yet another aspect, the present disclosure provides an example method of texturing a surface including contacting the abrasive article, as described herein, with the surface at a pressure and for a time sufficient to texture the surface, where the abrasive article has an effective grit dependent on the pressure.

In an additional aspect, the present disclosure provides a method of polishing a surface that involves contacting the abrasive article, as described herein, with the surface at a pressure and for a time sufficient to polish the surface, where the abrasive article has an effective grit dependent on the pressure.

In a further aspect, the present disclosure provides a machine for texturing or polishing a surface comprising the abrasive article as described herein.

BRIEF DESCRIPTION OF FIGURES

The accompanying drawings are included to provide a further understanding of the products of the disclosure, and are incorporated in and constitute a part of this specification. The drawings are not necessarily to scale, and sizes of various elements may be distorted for clarity. The drawings illustrate one or more embodiment(s) of the disclosure and together with the description serve to explain the principles and operation of the disclosure.

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1A:
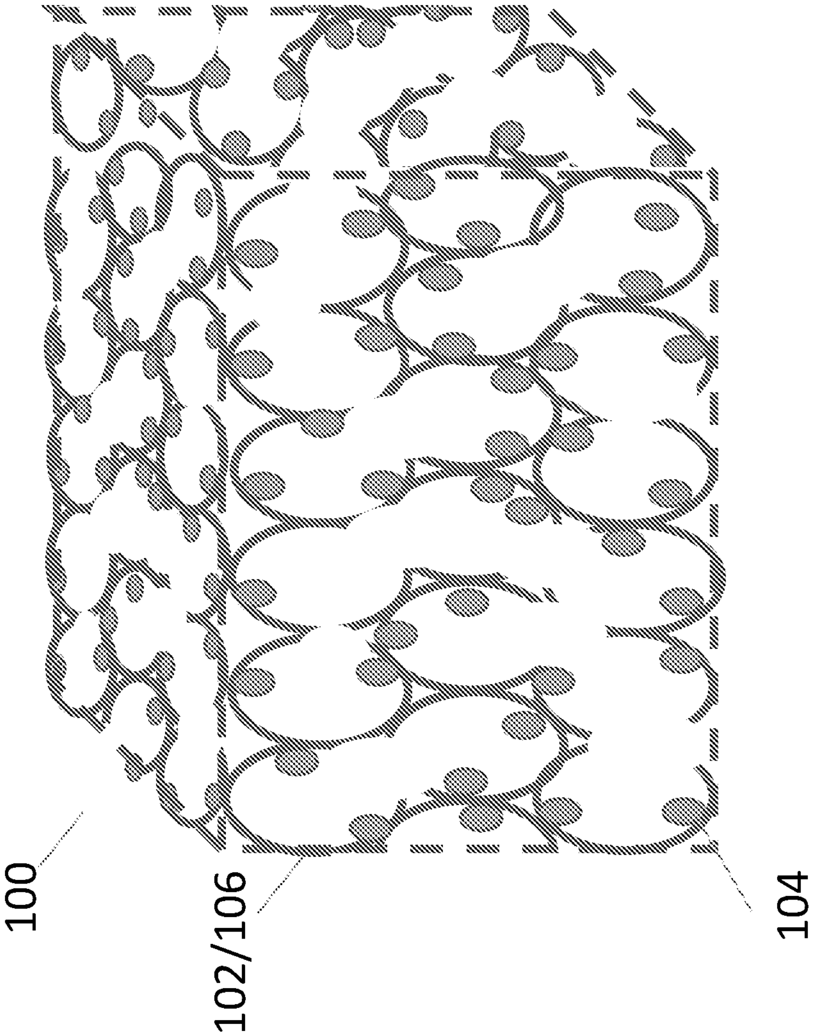
FIG. 1A illustrates a representation of an abrasive article, according to one or more example embodiments.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

For many materials, such as those made out of metal, wood, or stone, the surface can be conditioned in a variety of ways, such as to provide a smooth or polished surface. To do so, it is common to contact the surface with multiple abrasive articles (e.g., pads, papers, etc.) in succession to achieve desired results, starting from a lower grit pad and ending with a higher grit pad, with incremental grits in between. As a result, the surface roughness of the material can be incrementally reduced to provide an even and smooth texture to the surface. Thus, to provide a finished surface, multiple abrasive pads are typically used.

A user may choose to employ multiple abrasive articles on a surface to achieve a smoother finish due to several reasons. Different abrasive articles vary in terms of grit size and composition, thereby allowing for a more refined and gradual smoothing process. For instance, coarser abrasives can efficiently remove larger imperfections or material, while finer abrasives provide a finer finish. As such, using a progression of abrasive articles can help prevent skipping or uneven smoothing, ensuring a more consistent result. Additionally, certain abrasive articles may be better suited for specific materials or surface conditions, such as delicate surfaces or hard-to-reach areas, necessitating the use of multiple articles for comprehensive smoothing.

The use of multiple abrasive pads, however, increases both the total cost and time used to produce a final product. As such, there exists a need for abrasive articles that can effectively even and smooth textured surfaces in less time and with less cost, without requiring switching between different abrasive articles.

Example embodiments presented herein relate to techniques for generating and using abrasive articles that are designed to provide a variable effective grit during use. In particular, disclosed abrasive articles combine foam and abrasive particles in a way that enables the abrasive articles to engage surfaces based on the pressure applied to the article during the surface conditioning. By having a variable effective grit, disclosed abrasive articles can be used during multiple steps of smoothing or polishing a surface instead of requiring the user to switch between multiple conventional abrasive articles as typically used.

By way of an example, a disclosed abrasive article includes an open cell foam body and an abrasive composition disposed homogenously throughout the open cell foam body. The abrasive composition includes a resin and multiple abrasive particles. Each abrasive particle can have a threshold hardness (e.g., a hardness of at least 6 on a Mohs scale). As an example result, the abrasive article collectively has an effective grit that depends on the pressure applied to the abrasive article during use to smooth or even a surface.

When the disclosed abrasive article is used at very light pressures (i.e., the user or machine is pressing the abrasive article onto a surface with little pressure), the foam body of the abrasive article allows for the abrasive particles to shift away from the surface and avoid digging into the work surface. The foam body allows the abrasive particles to move about the abrasive article according to a path of least resistance. As the pressure applied to the disclosed abrasive article increases, the foam body of the abrasive article compresses and does not allow the abrasive particles to move out of the way as easily as during very light pressures. As an example result, more abrasive particles engage and modify the surface as the pressure applied to the abrasive article increases. In general, a user can use disclosed abrasive articles at a variety of pressures to achieve a spectrum of smoothing properties during the conditioning of surfaces. This differs from conventional sandpaper (and other conventional abrasive articles), where the abrasive grains of the conventional sandpaper are still fully exposed and trying to cut into a surface, typically leaving grooves close to their appropriate grit sizes, even when a user is applying minimal force to the conventional sandpaper.

Figure 1B:
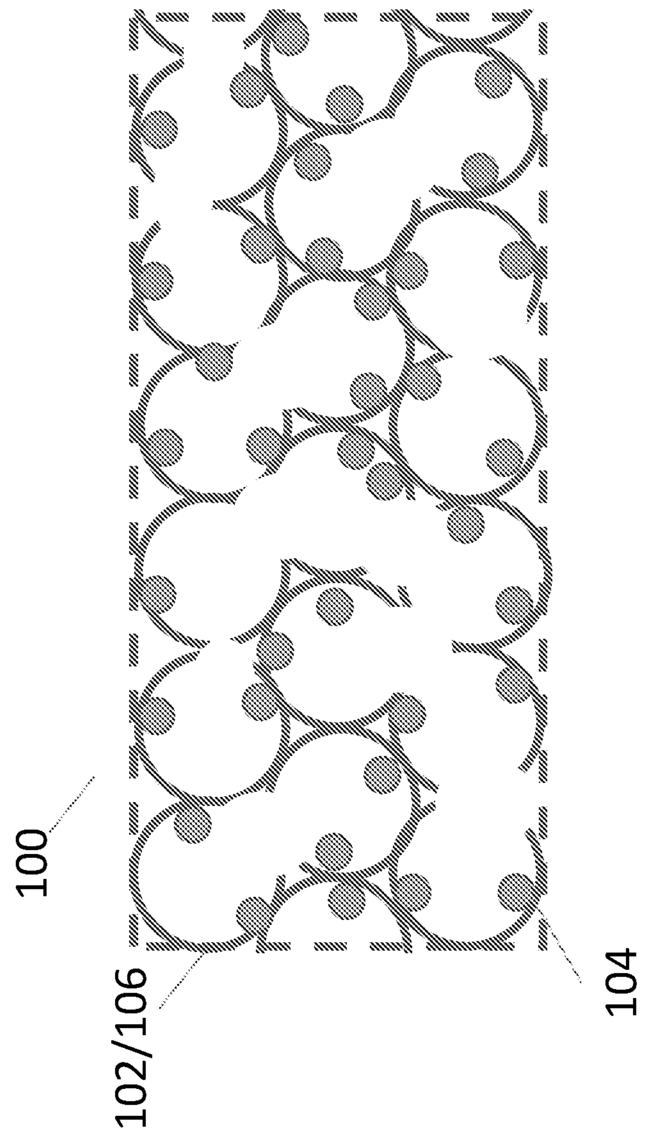
FIG. 1B shows another view of the representation of the abrasive article, according to one or more example embodiments.

Referring now to the Figures, FIG. 1A and FIG. 1B display different views of an example abrasive article. As shown in FIG. 1A, the abrasive article 100 consists of an open cell foam body 102 and an abrasive composition disposed homogenously throughout the open cell foam body 102. The abrasive composition is made up of a resin 106 and abrasive particles 104. In particular, the abrasive particles 104 as shown distributed throughout the open foam body 102 and can adjust position within the open foam body 102 based on the pressure applied to the abrasive article 100. FIG. 1B illustrates a side of the abrasive article 100 as described herein.

When the abrasive article 100 is used upon a surface, the application of a higher pressure on the abrasive article 100 causes more of the abrasive particles 104 to engage the surface, thereby causing a coarse abrasive effect. Conversely, when the abrasive article 100 is engaging a surface with a lighter pressure applied, less of the abrasive particles 104 may contact the surface, causing a finer abrasive effect. The open cell foam body 102 enables the abrasive particles 104 to move away from and not engage the surface due when lower pressures are applied on the abrasive article 100. As such, when the abrasive article 100 is used with very light pressure applied, effectively none of the abrasive particles 104 may engage with the surface, which allows the intrinsic abrasive properties of the open cell foam body 102 to become dominant resulting in a lightly polished surface. As shown, the variable grit offered by the abrasive article 100 during use across a spectrum of pressures allows the abrasive article 100 to be used on the same surface in replace of multiple conventional abrasive articles.

As described above, the abrasive article 100 includes an open cell foam body 102. In general, an open cell foam is a type of foam material that contains interconnected air pockets or cells throughout its structure. These cells are not fully enclosed, allowing air and other substances to pass through them. Open-cell foams are typically softer, more flexible, and have a higher compressibility compared to closed-cell foams. The open-cell structure also provides good breathability and moisture absorption properties, allowing for increased airflow and improved ventilation.

As such, the open cell foam body 102 can have different properties within example embodiments. For instance, the open cell foam body 102 can possess varying densities, which refers to the mass of foam material per unit volume. For instance, the open foam body 102 may consist of a low density open cell foam, a medium density open cell foam, or a high density open cell foam. Lower density foams have larger open cells and a more porous structure, which result in a lighter weight and increased flexibility. As such, in some examples, the open foam body 102 can be a lower density foam that offers excellent cushioning and insulation properties. Conversely, higher density foams have smaller, more compact cells, making them heavier and more rigid. The open cell foam body 102 can be made out of a higher density foam in some examples to provide enhanced durability and support, making the cell foam body 102 more suitable for applications requiring structural integrity or load-bearing capabilities. The choice of foam density for the open cell foam body 102 can depend on the specific requirements of the intended application of the abrasive article 100.

In some examples, the open cell foam body 102 is a low density open cell foam. For instance, the open cell foam body 102 can have a threshold density (e.g., a density of at least 6 kilogram per cubic meter ($kg/m^3$), or at least 8 $kg/m^3$, or at least 10 $kg/m^3$). In other embodiments, the open cell foam body has a density in the range 6 to 16 $kg/m^3$, or 8 to 16 $kg/m^3$, or 10 to 16 $kg/m^3$, or 12 to 16 $kg/m^3$. In some examples, the open cell foam body 102 consists of a medium density open cell foam, which may have a density of at least 16 $kg/m^3$, or at least 18 $kg/m^3$, or at least 20 $kg/m^3$. In some cases, the open cell foam body 102 has a density in the range of 16 to 48 $kg/m^3$, or 24 to 48 $kg/m^3$, or 30 to 48 $kg/m^3$, or 36 to 48 $kg/m^3$, or 42 to 48 $kg/m^3$. In some examples, the open cell foam body 102 consists of a high density open cell foam. For example, the open cell foam body can have a density of at least 48 $kg/m^3$, or at least 52 $kg/m^3$, or at least 58 $kg/m^3$, or at least 64 $kg/m^3$. In other examples, the open cell foam body 102 has a density in the range of 48 to 72 $kg/m^3$, or 52 to 72 $kg/m^3$, or 58 to 72 $kg/m^3$, or 64 to 72 $kg/m^3$.

Production of the open cell foam body 102 can vary within examples. For instance, the open cell foam body 102 can be made via a foam expansion process, which involves preparing a liquid polymer, such as polyester, polyurethane, polyether, melamine, or combinations thereof. The polymer can be mixed with various additives, including blowing agents, surfactants, and catalysts, to create a foamable mixture. The foamable mixture is poured into a mold or sprayed onto a surface, thereby enabling the blowing agents within the mixture to create bubbles (cells) as the mixture starts to expand. These cells are interconnected, forming the open cell structure. The formable mixture can then undergo a controlled expansion process, which allows the foam to rise and fill the desired shape for the abrasive article 100. The foam may be heated or undergo a chemical reaction to help the foam solidify and cure, which depends on the specific polymer being used. In some cases, production of the open cell foam body 102 also includes additional steps, such as cutting, trimming, or shaping to achieve the desired form and size. Surface treatments or coatings may also be applied for specific functional or aesthetic purposes.

As noted above, open cell foams are commonly made from polymeric materials by incorporating a "blowing agent" that expands throughout the material to provide an open cell structure. As such, the open cell foam body 102 may be selected from a variety of polymeric materials within examples, such as polyester, polyurethane, polyether, melamine, or combinations thereof. In some embodiments as described herein, the open cell foam body is an open cell melamine body.

In some embodiments, the open cell foam body 102 of the abrasive article 100 includes polyester as the major component of the open cell foam body 102 (i.e., greater than 50 percentage by weight (wt %). As such, other polymeric materials may be present in the open cell foam body 102 in minor amounts (e.g., less than 50 wt %). The other polymeric materials may be selected from the open cell foam body materials as described throughout (e.g., polyurethane, polyether, or melamine).

In some example embodiments, the weight of the open cell foam body 102 is made up of at least 50 wt % polyester, which can involve high amounts (e.g., polyester making up 60-75 percent of the open cell body's total weight). As such, in some implementations, the open cell foam body 102 is mostly polyester (e.g., 90 weight percent of the open cell foam body being made up of polyester material). In some embodiments as described herein, the open cell body comprises at least 95 wt %, or at least 98 wt %, or at least 99 wt % polyester, based on the weight of the open cell foam body.

In other examples, the open cell foam body 102 of the abrasive article 100 consists mainly of polyurethane with other polymeric materials potentially present in minor amounts (e.g., polymeric materials serving as less than 50 percent of the total weight of the open cell body). The other polymeric materials may be selected from the open cell foam body materials as described throughout (e.g., polyester, polyether, or melamine). For instance, the open cell foam body 102 can be made up of at least 50 wt % polyurethane, based on the weight of the open cell body. In some embodiments as described herein, the open cell body comprises at least 60 wt %, at least 70 wt %, or at least 75 wt % polyurethane, based on the weight of the open cell body. In some embodiments as described herein, the open cell body is mostly polyurethane. For example, in some embodiments as described herein, the open cell foam body comprises at least 90 wt % polyurethane, based on the weight of the open cell foam body. In some embodiments as described herein, the open cell body comprises at least 95 wt %, or at least 98 wt %, or at least 99 wt % polyurethane, based on the weight of the open cell foam body.

In some example embodiments, the open cell foam body 102 of the abrasive article 100 consists mostly of polyether (e.g., the weight of the open cell body is at least 50 percent polyether) and can have other polymeric materials present in minor amounts (e.g., less than 50 wt %). The other polymeric materials may be selected from the open cell foam body materials as described throughout (e.g., polyurethane, polyester, or melamine). In some embodiments as described herein, the open cell foam body 102 comprises at least 60 wt %, at least 70 wt %, or at least 75 wt % polyether, based on the weight of the open cell body. In some embodiments as described herein, the open cell body is mostly polyether. For example, in some embodiments as described herein, the open cell foam body comprises at least 90 wt % polyether, based on the weight of the open cell foam body. In some embodiments as described herein, the open cell body comprises at least 95 wt %, or at least 98 wt %, or at least 99 wt % polyether, based on the weight of the open cell foam body.

In some embodiments, the open cell foam body 102 consists mostly of melamine with other polymeric materials potentially included in minor amounts (e.g., less than 50 wt %). The other polymeric materials may be selected from the open cell foam body materials as described throughout (e.g., polyurethane, polyether, or polyester). As such, the open cell foam body 102 may comprise at least 50 wt % melamine based on the weight of the open cell body. In some embodiments, the open cell foam body 102 comprises at least 60 wt %, at least 70 wt %, or at least 75 wt % melamine, based on the weight of the open cell body. In some embodiments as described herein, the open cell foam body 102 is mostly melamine. For example, in some embodiments as described herein, the open cell foam body 102 comprises at least 90 wt % melamine, based on the weight of the open cell foam body. In some embodiments as described herein, the open cell body comprises at least 95 wt %, or at least 98 wt %, or at least 99 wt % melamine, based on the weight of the open cell foam body.

As described above, the abrasive article 100 includes an abrasive composition that is disposed homogeneously throughout the open cell foam body 102. For example, in some embodiments, the abrasive composition is disposed homogenously throughout at least 75%, at least 80%, at least 85%, or at least 90% of the open cell foam body. In some embodiments, the abrasive composition is disposed homogeneously throughout at least 95%, at least 97%, at least 98%, or at least 99% of the open cell foam body. In other examples, the abrasive composition may be limited to a portion of the open cell foam body 102.

As would be understood by the person of ordinary skill in the art, an open cell foam has porous structure defined by open cells. These cells define the structure of the foam and their open nature allows both air and liquid to pass throughout the body of the material. The abrasive composition of the abrasive article 100 adheres to the open cell structure of the open cell foam body 102 and does not stay in the pores of the structure. As such, the abrasive composition does not clog the pores of the open cell foam body. Accordingly, in some embodiments as described herein, the abrasive composition is disposed homogeneously on the open cell structure of the open cell foam body. For example, in some embodiments as described herein, the abrasive composition is disposed homogeneously on at least 75%, or at least 80%, or at least 85%, or at least 90% of the open cell structure. In some embodiments as described herein, the abrasive composition is disposed homogeneously on at least 95%, at least 97%, at least 98%, or at least 99% of the open cell structure.

As described above, the abrasive composition includes a resin 106 and abrasive particles 104. The resin 106 used within examples for the abrasive composition can vary, and may include a natural resin, a synthetic resin, or a combination thereof. For instance, some natural resin options that can be used include shellac, copal, dammar, mastic, sandarac, pitch, or combinations thereof and some synthetic resin options that can be used include silicone resins, epoxy resins, polyurethane resin, and/or UV curable resins.

The amount of resin 106 present in the abrasive article 100 may vary within example embodiments. In some embodiments, the resin 106 is present in the abrasive article 100 in an amount of at least 10 gram per cubic inch (g/in$^3$), based on the volume of the abrasive article. For example, in some embodiments, the resin 106 is present in the abrasive article 100 in an amount of at least 12 g/in$^3$ or at least 15 g/in$^3$, based on the volume of the abrasive article. In some embodiments as described above, the resin 106 is present in the abrasive article 100 in an amount in the range of 10-30 g/in$^3$, based on the volume of the abrasive article. For example, in various embodiments, the resin 106 is present in the abrasive article 100 in an amount in the range of 10-28 g/in$^3$, or 10-25 g/in$^3$, or 12-30 g/in$^3$, or 12-28 g/in$^3$, or 12-25 g/in$^3$, or 15-30 g/in$^3$, or 15-28 g/in$^3$, or 15-25 g/in$^3$, based on the volume of the abrasive article.

As described above, the abrasive composition includes abrasive particles 104, which can vary in total quantity of particles and can include particles that have at least a threshold hardness. For instance, each abrasive particle may have a hardness of at least 6 on a Mohs scale in some examples. The abrasive articles 104 can differ in hardness in some examples. As such, the particles selected for an abrasive article disclosed herein can depend on the desired use (e.g., the hardness of the surface that the article will be used on). In various embodiments as described herein, each particle has a hardness of at least 6.5, or at least 7, or at least 7.5, or at least 8, or at least 9, on a Mohs scale. For example, in some embodiments, each particles has hardness in the range of 6 to 10, or 6.5 to 10, or 7 to 10, or 7.5 to 10, or 8 to 10, or 8.5, or 9 to 10, on the Mohs scale.

The abrasive particles 104 may be selected from any abrasive particle having a suitable hardness and known in the art. The selection of one abrasive particle in the plurality of particles does not influence the selection of the next abrasive particle in the plurality of particles. As such, each abrasive particle may be individually selected from any abrasive particle having a suitable hardness and known in the art. For example, in some embodiments as described herein, each particle is individually selected from flintstone, aluminum oxide, silicon carbide, cubic boron nitride (cBN), zirconium dioxide, cerium dioxide, or diamond. In some embodiments as described herein, the abrasive particles 104 can consist of at least one particle selected from flintstone, aluminum oxide, silicon carbide, cBN, zirconium dioxide, cerium dioxide, or diamond.

In some embodiments, the abrasive particles 104 comprises at least 50 wt % flintstone, based on the weight of the plurality. For example, in various embodiments, the plurality of abrasive particles comprises at least 65 wt %, or 70 wt %, or 75 wt %, or 80 wt %, flintstone, based on the weight of the plurality. In some embodiments, the plurality of abrasive particles comprises at least 90 wt % flintstone, based on the weight of the plurality. For example, in various embodiments, the plurality of abrasive particles comprises at least 95 wt %, or 97 wt %, or 98 wt %, or 99 wt % flintstone, based on the weight of the plurality.

In some embodiments, the abrasive particles 104 comprises at least 50 wt % aluminum oxide, based on the weight of the plurality. For example, in various embodiments, the abrasive particles 104 comprises at least 65 wt %, or 70 wt %, or 75 wt %, or 80 wt % aluminum oxide, based on the weight of the plurality. In some embodiments, the abrasive particles 104 comprises at least 90 wt % aluminum oxide, based on the weight of the plurality. For example, in various embodiments, the abrasive particles 104 comprises at least 95 wt %, or 97 wt %, or 98 wt %, or 99 wt % aluminum oxide, based on the weight of the plurality.

In some embodiments, the abrasive particles 104 comprises at least 50 wt % silicon carbine, based on the weight of the abrasive particles overall. For example, the abrasive particles 104 can comprise at least 65 wt %, or 70 wt %, or 75 wt %, or 80 wt % silicon carbine, based on the weight of the plurality. In some embodiments, the abrasive particles 104 comprise at least 90 wt % silicon carbine, based on the weight of the plurality. For example, the abrasive particles 104 can comprises at least 95 wt %, or 97 wt %, or 98 wt %, or 99 wt % silicon carbine, based on the weight of the plurality.

In some embodiments, the abrasive particles 104 are made up of at least 50 wt % cBN, based on the weight of the abrasive particles overall. For example, in various embodiments, the plurality of abrasive particles comprises at least 65 wt %, or 70 wt %, or 75 wt %, or 80 wt % cBN, based on the weight of the plurality. In some embodiments, the plurality of abrasive particles comprises at least 90 wt % cBN, based on the weight of the plurality. For example, in various embodiments, the plurality of abrasive particles comprises at least 95 wt %, or 97 wt %, or 98 wt %, or 99 wt % cBN, based on the weight of the plurality.

In some embodiments, the abrasive particles 104 comprise at least 50 wt % zirconium dioxide, based on the weight of the abrasive particles overall. For example, in various embodiments, the abrasive particles 104 comprise at least 65 wt %, or 70 wt %, or 75 wt %, or 80 wt % zirconium dioxide, based on the weight of the abrasive particles overall. In some embodiments, the plurality of abrasive particles comprises at least 90 wt % zirconium dioxide, based on the weight of the plurality. For example, in various embodiments, the plurality of abrasive particles comprises at least 95 wt %, or 97 wt %, or 98 wt %, or 99 wt % zirconium dioxide, based on the weight of the plurality.

In some embodiments as described herein, the plurality of abrasive particles comprises at least 50 wt % cerium oxide, based on the weight of the plurality. For example, in various embodiments, the plurality of abrasive particles comprises at least 65 wt %, or 70 wt %, or 75 wt %, or 80 wt % cerium oxide, based on the weight of the plurality. In some embodiments, the plurality of abrasive particles comprises at least 90 wt % cerium oxide, based on the weight of the plurality. For example, in various embodiments, the plurality of abrasive particles comprises at least 95 wt %, or 97 wt %, or 98 wt %, or 99 wt % cerium oxide, based on the weight of the plurality.

In some embodiments as described herein, the plurality of abrasive particles comprises at least 50 wt % diamond particles (e.g., diamond dust), based on the weight of the plurality. For example, in various embodiments, the plurality of abrasive particles comprises at least 65 wt %, or 70 wt %, or 75 wt %, or 80 wt % diamond particles (e.g., diamond dust), based on the weight of the plurality. In some embodiments, the plurality of abrasive particles comprises at least 90 wt % diamond particles (e.g., diamond dust), based on the weight of the plurality. For example, in various embodiments, the plurality of abrasive particles comprises at least 95 wt %, or 97 wt %, or 98 wt %, or 99 wt % diamond particles (e.g., diamond dust), based on the weight of the plurality.

As described above, the plurality of abrasive particles may be selected from a variety of materials. Accordingly, the plurality of abrasive particles may have a variety of particle size distributions depending on the particular combination of particles selected for the plurality. For example, the plurality of abrasive particle may have a unimodal particle size distribution, a bimodal particle size distribution, or a multimodal particle size distribution.

In some embodiments as described herein, the plurality of abrasive particles has a unimodal particle size distribution. In some embodiments as described herein, the plurality of abrasive particle has a $d_{50}$ particle size of at least 0.1 μm. As used herein, the $d_{50}$ particle size is the median particle size, i.e., the size of the particle at which 50% of the particles are of larger particle size and 50% are of smaller particle size. As used herein, "particle size" is the largest dimension of the particle. In various embodiments as described herein, the plurality of abrasive particles has a $d_{50}$ particle size of at least 0.25 μm, at least 0.5 μm, or 1 μm, at least 5 μm, or at least 10 μm. In some embodiments, the plurality of abrasive particles has a $d_{50}$ particle size in the range of 0.1 μm to 100 μm. For example, in various embodiments, the plurality of abrasive particles has a $d_{50}$ particle size in the range of 0.1 μm to 80 μm, or 0.1 μm to 60 μm, or 1 μm to 100 μm, or 1 μm to 80 μm, or 1 μm to 60 μm, or 10 to 100 μm, or 10 to 80 μm, or 10 to 60 μm, or 20 to 100 μm, or 20 to 80 μm, or 20 to 60 μm, or 40 to 100 μm, or 40 to 80 μm, or 40 to 60 μm. In various embodiments as described herein, the plurality of abrasive particles has $d_{10}$ particle size of at least 0.1 μm, at least 0.25 μm, at least 0.5 μm, at least 1 μm, at least 5 μm, or at least 10 μm. In various embodiments as described herein, the plurality of abrasive particles has $d_{90}$ particle size of no more than 1000 μm, no more than 500 μm, no more than 250 μm, or no more than 100 μm.

In some embodiments as described herein, the plurality of abrasive particle has a bimodal particle size distribution. For example, in some embodiments, the plurality of abrasive particles may have a first $d_{50}$ particle size and a second $d_{50}$ particle size. In some embodiments as described herein, the first $d_{50}$ particle size is greater than the second $d_{50}$ particle size. In some embodiments as described herein, the plurality of abrasive particles has a first $d_{50}$ particle size of at least 1 μm (e.g., at least 5 μm, at least 10 μm, at least 15 μm, or at least 20 μm) and the second $d_{50}$ particle size of at least 0.1 μm (e.g., at least 0.25 μm, at least 0.5 μm, at least 1 μm, at least 5 μm, or at least 10 μm). In some embodiments as described herein, the plurality of abrasive particles has a first $d_{50}$ particle size in the range of 0.1 μm to 100 μm (e.g., 0.1 μm to 80 μm, or 0.1 μm to 60 μm, or 1 μm to 100 μm, 1 μm to 80 μm, or 1 μm to 60 μm, or 10 to 100 μm, or 10 to 80 μm, or 10 to 60 μm, or 20 to 100 μm, or 20 to 80 μm, or 20 to 60 μm, or 40 to 100 μm, or 40 to 80 μm, or 40 to 60 μm) and a second $d_{50}$ particle size in the range of 0.1 μm to 100 μm (e.g., 0.1 μm to 80 μm, or 0.1 μm to 60 μm, or 1 μm to 100 μm, 1 μm to 80 μm, or 1 μm to 60 μm, or 10 to 100 μm, or 10 to 80 μm, or 10 to 60 μm, or 20 to 100 μm, or 20 to 80 μm, or 20 to 60 μm, or 40 to 100 μm, or 40 to 80 μm, or 40 to 60 μm), wherein the first $d_{50}$ particle size is greater than the second $d_{50}$ particle size.

In some embodiments as described herein, the plurality of abrasive particles has a multimodal size distribution (e.g., at least two $d_{50}$ particle sizes, at least three $d_{50}$ particle sizes, or at least four $d_{50}$ particle sizes). The $d_{50}$ particles sizes of the multimodal size distribution may be any of the $d_{50}$ particle sizes as described herein with respect to the unimodal and bimodal size distributions.

In some embodiments as described herein, the plurality of abrasive particles is present in abrasive article in an amount of at least 0.1 g/in$^3$, based on the volume of the abrasive article. For examples, in various embodiments, the plurality may be present in an amount of at least 0.25 g/in$^3$, at least 0.5 g/in$^3$, at least 1.0 g/in$^3$, or at least 1.5 g/in$^3$, based on the volume of the abrasive article. In some embodiments as described herein, the plurality of abrasive particles is present in the abrasive article in an amount in the range of 0.2-2.5 g/in$^3$, based on the volume of the abrasive article. For example, in various embodiments, the plurality may be present in an amount in the range of 0.2-2.5 g/in$^3$, or 0.2-2.0 g/in$^3$, or 0.2-1.5 g/in$^3$, or 0.5-2.5 g/in$^3$, or 0.5-2.0 g/in$^3$, or 0.5-1.5 g/in$^3$, or 1.0-2.5 g/in$^3$, or 1.0-2.0 g/in$^3$, or 1.0-1.5 g/in$^3$, based on the volume of the abrasive article.

In some embodiments, the resin 106 and the abrasive particles 104 are present in the abrasive composition in a ratio of at least 300:1. In other examples, the resin 106 and the abrasive particles 104 are present in the abrasive composition in a ratio of at least 250:1, or at least 200:1, or at least 150:1, or at least 120:1, or at least 100:1. In yet other examples, the resin 106 and the abrasive particles 104 are present in the abrasive composition in a ratio of at most 1:1. For example, in various embodiments, the resin and plurality of abrasive particles are present in the abrasive composition in a ratio of at most 2:1, or at most 4:1). In some embodiments as described herein, the resin and plurality of abrasive particles are present in the abrasive composition in a ratio is in the range of 300:1 to 1:1. For example, in various embodiments, the resin and plurality of abrasive particles are present in the abrasive composition in a ratio is in the range of 150:1 to 1:1, or 120:1 to 1:1, or 100:1 to 1:1, or 50:1 to 1:1, or 20:1 to 1:1, or 15:1 to 1:1, or 12:1 to 1:1, to 5:1 to 1:1, or 300:1 to 2:1, or 150:1 to 2:1, or 120:1 to 2:1, or 100:1 to 2:1, or 50:1 to 2:1, or 20:1 to 2:1, or 15:1 to 2:1, or 12:1 to 2:1, to 5:1 to 2:1, or 300:1 to 4:1, or 150:1 to 4:1, or 120:1 to 4:1, or 100:1 to 4:1, or 50:1 to 4:1, or 20:1 to 4:1, or 15:1 to 4:1, or 12:1 to 4:1, to 5:1 to 4:1.

As described above, the abrasive article 100 has an effective grit that depends on the pressure applied to the article during use. The effective grit can be considered the grit of the abrasive article when used on a surface (e.g., to polish a surface). Additionally, the abrasive article has a grit independent of when a pressure is applied to the articles. As used herein, this pressure independent grit will be referred to as an "average grit" and as used throughout, grit refers to grit number. The average grit can be considered the inherent grit of the abrasive article when not used on a surface. As such, the average grit of the abrasive article is not particularly limited and may be an ultra-fine, fine, medium, or coarse grit. For example, in some embodiments as described herein, the abrasive article has an average grit that is an ultra-fine grit. In some embodiments as described herein, the abrasive article has an average grit of at least 100,000 grit. For example, in various embodiments as described herein, the abrasive article has an average grit or at least 80,000 grit, at least 60,000 grit, or at least 40,000 grit. In various embodiments as described herein, the abrasive article has an average grit in the range of 8,000 to 100,000 grit, or 12,000 to 100,000 grit, or 20,000 to 100,000 grit, or 50,000 to 100,000 grit, or 8,000 to 80,000 grit, or 12,000 to 100,000 grit, or 20,000 to 80,000 grit, or 50,000 to 80,000 grit. In some embodiments as described herein, the abrasive article has an average grit that is a fine grit. In some embodiments as described herein, the abrasive article has an average grit of no more than 300 grit. For example, in various embodiments as described herein, the abrasive article has an average grit of no more than 400 grit, or 500 grit, or 600 grit. In various embodiments, the abrasive article has an average grit in the range of 300 to 8000 grit, or 300 to 6000, or 300 to 4000, or 300 to 2000 grit, or 400 to 8000 grit, or 400 to 6000 grit, or 400 to 4000 grit, or 400 to 2000 grit. In various embodiments as described herein, the abrasive article has an average grit in the range of 2000-8000 grit, or 2000-7500 grit, or 2000-7000 grit, or 2000-6500 grit, or 2500-8000 grit, or 2500-7500 grit, or 2500-7000 grit, or 2500-6500 grit, or 3000-8000-grit, or 3000-7500 grit, or 3000-7000 grit, or 3000-6500 grit, or 3500-8000 grit, or 3500-7500 grit, or 3500-7000 grit, or 3500-6500 grit.

As described above, the abrasive article has an effective grit that is dependent on the pressure applied to the articles, which allows for surface conditioning of materials without having to change abrasive article during the conditioning process. Without being bound by theory, the variable effective grit is due to the open cell foam body of the article. At very light pressures, the foam can deflect and give, allowing the abrasive particles to go somewhere other than into surface through a path of least resistance. As the applied pressure increases, the foam compresses and does not allow the abrasive particles to move out throughout the body of the article. Accordingly, the present inventors have found that at pressures around 5.5 kilopascal (kPa), the abrasive particles fully engage with the surface. At this pressure, the foam is fully compressed and allows the abrasive particles to engage with the surface. In general, a higher applied pressure during use causes more of the abrasive particles to engage the surface, thereby causing a coarse abrasive effect and a lower effective grit compared to the average grit. In some embodiments as described herein, the abrasive article has an effective grit (e.g., grit number) that is lower than the average grit (e.g., grit number) when a pressure of greater than 3.75 kPa (e.g., in the range of 3.75 to 5.5 kPa) is applied. In various embodiments as described herein, the effective grit (e.g., grit number) is at least 5% (e.g., at least 10%, or at least 15%, or at least 20%) lower than the average grit (e.g., grit number) when a pressure of greater than 3.75 kPa (e.g., in the range of 3.75 to 5.5 kPa) is applied. In various embodiments as described herein, the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) lower than the average grit (e.g., grit number) when a pressure of greater 3.75 kPa (e.g., in the range of 3.75 to 5.5 kPa) is applied. In some embodiments as described herein, the effect grit is at least 600 grit (e.g., at least 400 grit, or at least 300 grit) when a pressure of greater than 3.75 kPa (e.g., in the range of 3.75 to 5.5 kPa) is applied.

Additionally, a lower pressure applied during use using example abrasive articles herein can result in less of the abrasive particles engaging the surface, thereby causing a finer abrasive effect and a higher effective grit when compared to the average grit. Without being bound by theory, light pressure applied (approximately 2 kPa) may not produce enough force to cause any polishing of the surface. The foam of disclosed articles can effectively shields a surface from the abrasive grains and allows the abrasive particles to flex out of the way when a user is applying minimal force. This is in contrast to conventional abrasive materials (such as sandpaper), as the abrasive particles on these articles are still fully exposed no matter what pressure is applied. Accordingly, conventional abrasive materials typically leave grooves close to the size of the abrasive grains even when light pressures are used. In particular, the foam of the abrasive articles describe herein effectively shields the surface from any abrasive particles disposed throughout the article and thus light pressures can be applied to the abrasive article to cause the abrasive article to provide an ultra-fine grit to the surface. In some embodiments as described herein, the abrasive article has an effective grit (e.g., grit number) that is greater than the average grit when a pressure of less than 3.75 kPa (e.g., in the range of 2 to 3.75 kPa) is applied. In various embodiments, the effective grit (e.g., grit number) is at least 5% (e.g., at least 10 wt %, or at least 15 wt %, or at least 20 wt %) greater than the average grit (e.g., grit number) when a pressure of less than 3.75 kPa (e.g., in the range of 2 to 3.75 kPa) is applied. In various embodiments, the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) greater than the average grit (e.g., grit number) when a pressure of less than 3.75 kPa (e.g., in the range of 2 to 3.75 kPa) is applied. For example, the abrasive article can have an effect grit that is at least 10,000 grit (e.g., at least 8000 grit, at least 6000 grit, or at least 4000 grit) when a pressure of less than 3.75 kPa (e.g., in the range of 2 to 3.75 kPa) is applied.

The size and shape of the abrasive article is not particularly limited and may be selected by the person of ordinary skill in the art based on the end use of the abrasive article. The thickness of the abrasive article can similarly be varied. For example, in various embodiments, the abrasive article has a thickness of at least 0.5 mm, at least 1 mm, or at least 2 mm. In some embodiments as described herein, the abrasive article has a thickness in the range of 1 to 125 mm. For example, in various embodiments as described herein, the abrasive article has a thickness in the range of 1 to 100 mm, or 1 to 75 mm, or 1 to 50 mm, or 10 to 125 mm, or 10 to 100 mm, or 10 to 75 mm, or 10 to 50 mm, or 10 to 25 mm, or 25 to 125 mm, or 25 to 100 mm, or 25 to 75 mm, or 25 to 50 mm. In some embodiments as described herein, the abrasive article has a thickness in the range of 1 to 10 mm. For example, in various embodiments, the abrasive article has a thickness in the range of 1 to 8 mm, or 1 to 6 mm, or 2 to 10 mm, or 2 to 8 mm, or 2 to 6 mm.

Figure 2:
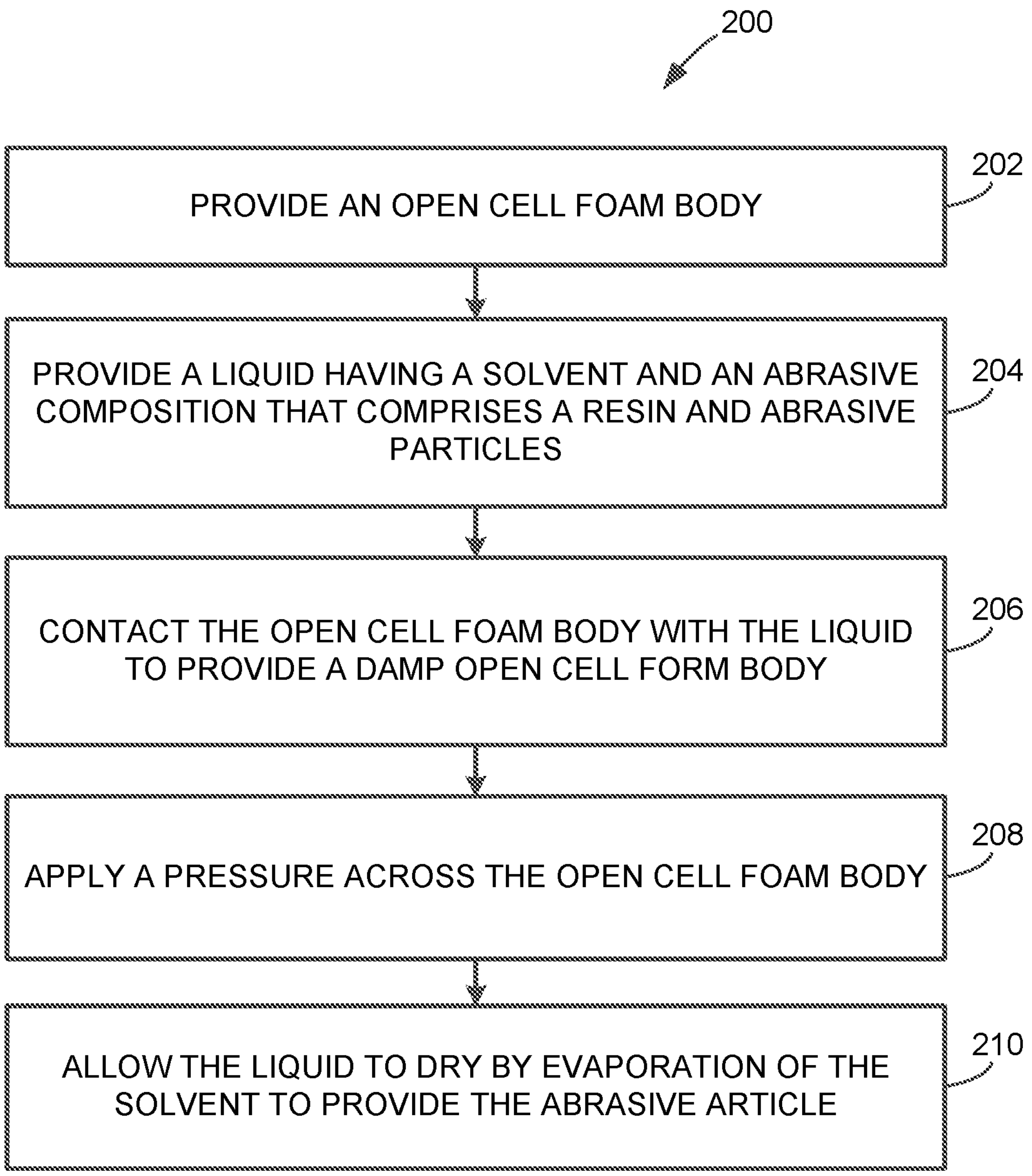
FIG. 2 is a flow chart of a method for making an abrasive article, according to one or more example embodiments.

FIG. 2 is a flow chart of a method for making an example abrasive article. Method 200 may include one or more operations, functions, or actions, as depicted by one or more of blocks 202, 204, 206, 208, and 210, each of which may be carried out by any of the systems shown in prior figures, among other possible systems.

At block 202, method 200 involves providing an open cell foam body. The open cell foam body can be generated using techniques described above.

At block 204, method 200 involves providing a liquid comprising a solvent and an abrasive composition. The abrasive composition is made up of a resin and multiple abrasive particles. Each abrasive particle included within the abrasive composition can have a threshold hardness (e.g., a hardness of at least 6 on the Mohs scale). The threshold hardness used to measure the abrasive particles used within the composition can depend on the desired use of the abrasive article that is being made. The resin is mixed in along with the abrasive particles to create the abrasive composition.

In some embodiments, the resin and the solvent may be present in a weight ratio of at least 4:1. For example, in various embodiments as described herein, the resin and the solvent may be present in a weight ratio of at least 6:1, at least 8:1, at least 10:1, or at least 12:1. In various embodiments, the liquid comprises the resin and the solvent in a weight ratio in the range of 4:1 to 16:1, or 4:1 to 14:1, or 4:1 to 12:1, or 6:1 to 14:1, or 6:1 to 16:1, or 6:1 to 14:1, or 6:1 to 12:1, or 8:1 to 16:1, or 8:1 to 14:1, or 8:1 to 12:1. In some embodiments as described herein, the liquid comprises the solvent and the plurality of abrasive particles in a ratio of at least 1:1 milliliter per gram (mL/g). For example, in various embodiments as described herein, the liquid comprises the solvent and the plurality of particles in a ratio of at least 1.5:1, at least 2:1, or at least 2.5:1 mL/g. In some embodiments as described herein, the liquid comprises the solvent and the plurality of abrasive particles in a ratio in the range of 1:1 to 40:1 mL/g. For example, in various embodiments, the liquid comprises the solvent and the plurality of particles in the range of 1:1 to 36:1, or 1:1 to 32:1, or 1:1 to 28:1, or 1:1 to 24:1, or 1.5:1 to 40:1, or 1.5:1 to 36:1, or 1.5:1 to 32:1, or 1.5:1 to 28:1, or 1.5:1 to 24:1, 2:1 to 40:1, or 2:1 to 36:1, or 2:1 to 32:1, or 2:1 to 28:1, or 2:1 to 24:1, or 2.5:1 to 40:1, or 2.5:1 to 36:1, or 2.5:1 to 32:1, or 2.5:1 to 28:1, or 2.5:1 to 24:1 mL/g.

The solvent used in the liquid can vary within examples. Any solvent that the resin is miscible in can be used in the methods as described herein. In some embodiments, the solvent is selected from an alcohol. For example, the alcohol may be selected from methanol, ethanol, propanol, isopropanol, butanol, or isobutanol.

At block 206, method 200 involves contacting the open cell foam body with the liquid to provide a damp open cell foam body. The method of contacting is not particularly limited and may be selected from any application method known to the person of ordinary skill in the art. For example, in various embodiments as described herein, contacting the open cell foam body with the liquid comprises spraying, coating, or dunking the open cell foam body with (or in) the liquid. In some embodiments as described herein, contacting the open cell foam body with the liquid saturates the open cell foam body. By saturating the open cell foam body with the liquid, homogenous distribution of the abrasive composition can be provided to abrasive article.

At block 208, method 200 involves applying a pressure across the open cell foam body. By applying pressure across the damp open cell foam body, the abrasive composition adheres to the open cell structure of the foam body. In some embodiments as described herein, the pressure applied is at least 1 MegaPascal (MPa). In some embodiments as described herein, the pressure applied is no more than 4 MPa. In some embodiments as described herein, the pressure applied is in the range of 1-4 MPa (e.g., in the range of 1-3.5 MPa, or 1-3.2 MPa, or 1.2-4 MPa, or 1.2-3.5 MPa, or 1.2-3.2 MPa). Without being bound by theory, to achieve a coarser average grit on the abrasive article, higher pressures are required during application of the abrasive article to diffuse the abrasive composition throughout the open cell foam body. In some embodiments as described herein, the pressure is applied uniformly across the open cell foam body.

At block 210, method 200 involves allowing the liquid to dry by evaporation of the solvent to provide the abrasive article. In some examples, the abrasive composition is disposed homogeneously throughout the open cell foam body and the abrasive article has an effective grit dependent on a pressure applied to the article. The resin is retained within the abrasive article to hold the abrasive particles to the foam. As such, the quantity and type of resin used can depend on the quantity and type of abrasive particles used as well as the density of the open cell foam body.

In some embodiments, allowing the liquid to dry by evaporation of the solvent is conducted at room temperature while other embodiments involve allowing the liquid to dry by evaporation of the solvent is conducted at an elevated temperature. The appropriate elevated temperature can be selected based on the boiling point of the solvent. For example, in various embodiments, the elevated temperature is at least 50° C., or at least 60° C., or at least 70° C.

Figure 3:
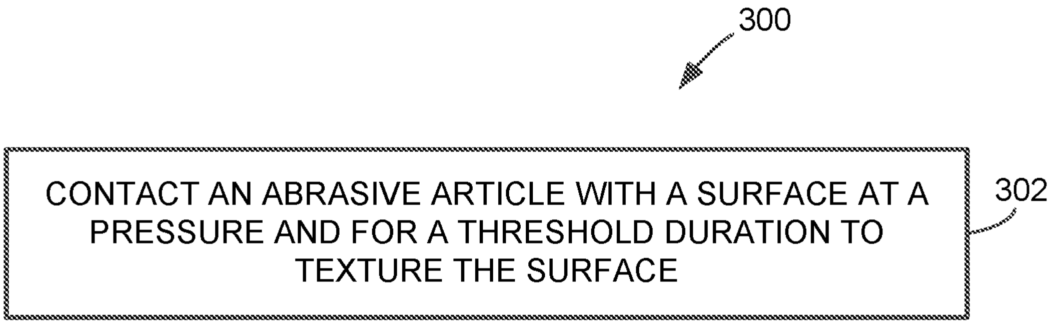
FIG. 3 is a flow chart of a method for using an abrasive article to texture a surface, according to one or more example embodiments.

FIG. 3 is a flow chart of a method for texturing a surface. Method 300 may include one or more operations, functions, or actions, as depicted by one or more of blocks 302, each of which may be carried out by any of the systems shown in prior figures, among other possible systems.

At block 302, method 300 involves contacting an abrasive article with a surface at a pressure and for a time sufficient to texture the surface. The abrasive article can be implemented similarly to the abrasive article 100 shown in FIGS. 1A-1B. Other disclosed abrasive articles can be used for method 300 as well. In general, the surface is not particularly limited. For example, in some embodiments, the surface may be selected from a metal surface, a stone surface, a polymer surface, a laminate surface, a glass surface, or a wood surface. In some embodiments as described herein, contacting the abrasive article is conducted at a pressure of greater than 3.75 kPa (e.g., in the range of 3.75 to 5.5 kPa) provides the abrasive article an effective grit (e.g., grit number) that is lower than the average grit (e.g., grit number). In some embodiments as described herein, the abrasive article has an effective grit (e.g., grit number) that is greater than the average grit when a pressure of less than 3.75 kPa (e.g., in the range of 2 to 3.75 kPa) is applied. In various embodiments, the effective grit (e.g., grit number) is at least 5% (e.g., at least 10 wt %, or at least 15 wt %, or at least 20 wt %) lower than the average grit (e.g., grit number) when a pressure of greater than 3.75 kPa (e.g., in the range of 3.75 to 5.5 kPa) is applied. In various embodiments as described herein, the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) lower than the average grit (e.g., grit number) when a pressure of greater than 3.75 kPa (e.g., in the range of 3.75 to 5.5 kPa) is applied. For example, in some embodiments, the effective grit is at least 600 grit (e.g., at least 400 grit, or at least 300 grit) when a pressure of greater than 3.75 kPa (e.g., in the range of 3.75 to 5.5 kPa) is applied. In some embodiments as described herein, contacting the abrasive article is conducted at a pressure of less than 3.75 kPa (e.g., in the range of 2 to 3.75 kPa) provides the abrasive article an effective grit (e.g., grit number) that is greater than the average grit (e.g., grit number). In various embodiments, the effective grit (e.g., grit number) is at least 5% (e.g., at least 10 wt %, or at least 15 wt %, or at least 20 wt %) greater than the average grit (e.g., grit number) when a pressure of less than 3.75 kPa (e.g., in the range of 3.75 to 5.5 kPa) is applied. In various embodiments, the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) greater than the average grit (e.g., grit number) when a pressure of less than 3.75 kPa (e.g., in the range of 2 to 3.75 kPa) is applied. For example, in some embodiments, the abrasive article has an effect grit that is at least 10,000 grit (e.g., at least 8000 grit, at least 6000 grit, or at least 4000 grit) when a pressure of less than 3.75 kPa (e.g., in the range of 2 to 3.75 kPa) is applied.

Figure 4:
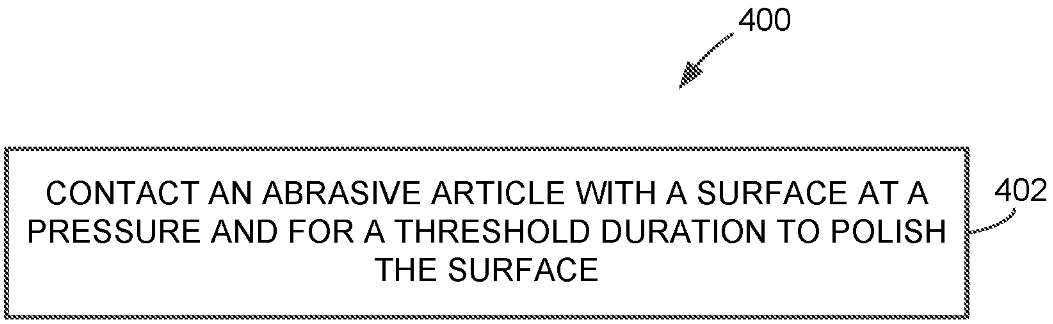
FIG. 4 is a flow chart of a method for using an abrasive article to polish a surface, according to one or more example embodiments.

FIG. 4 is a flow chart of a method for polishing a surface. Method 400 may include one or more operations, functions, or actions, as depicted by one or more of blocks 402, each of which may be carried out by any of the systems shown in prior figures, among other possible systems.

At block 402, method 400 involves contacting an abrasive article with a surface at a pressure and for a threshold duration to polish the surface. The surface is not particularly limited. For example, in some embodiments, the surface may be selected from a metal surface, a stone surface, a polymer surface, a laminate surface, or a glass surface. In some embodiments as described herein, contacting the abrasive article is conducted at a pressure of greater than 3.75 kPa (e.g., in the range of 3.75 to 5.5 kPa) provides the abrasive article an effective grit (e.g., grit number) that is lower than the average grit (e.g., grit number). In various embodiments, the effective grit (e.g., grit number) is at least 5% (e.g., at least 10 wt %, or at least 15 wt %, or at least 20 wt %) lower than the average grit (e.g., grit number) when a pressure of greater than 3.75 kPa (e.g., in the range of 3.75 to 5.5 kPa) is applied. In various embodiments as described herein, the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) lower than the average grit (e.g., grit number) when a pressure of greater than 3.75 kPa (e.g., in the range of 3.75 to 5.5 kPa) is applied. For example, in some embodiments, the effective grit is at least 600 grit (e.g., at least 400 grit, or at least 300 grit) when a pressure of greater than 3.75 kPa (e.g., in the range of 3.75 to 5.5 kPa) is applied. In some embodiments as described herein, the abrasive article has an effective grit (e.g., grit number) that is greater than the average grit when a pressure of less than 3.75 kPa (e.g., in the range of 2 to 3.75 kPa) is applied. In various embodiments, the effective grit (e.g., grit number) is at least 5% (e.g., at least 10 wt %, or at least 15 wt %, or at least 20 wt %) greater than the average grit (e.g., grit number) when a pressure of less than 3.75 kPa (e.g., in the range of 2 to 3.75 kPa) is applied. In some embodiments as described herein, contacting the abrasive article is conducted at a pressure of less than 3.75 kPa (e.g., in the range of 2 to 3.75 kPa) provides the abrasive article an effective grit (e.g., grit number) that is greater than the average grit (e.g., grit number). In various embodiments, the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) greater than the average grit (e.g., grit number) when a pressure of less than 3.75 kPa (e.g., in the range of 2 to 3.75 kPa) is applied. For example, in some embodiments, the abrasive article has an effect grit that is at least 10,000 grit (e.g., at least 8000 grit, at least 6000 grit, or at least 4000 grit) when a pressure of less than 3.75 kPa (e.g., in the range of 2 to 3.75 kPa) is applied.

Another aspect of the present disclosure provides a machine for texturing or polishing a surface comprising the abrasive article as described herein.

Additional aspects of the disclosure are provided by the following enumerated example embodiments (EEEs), which may be combined in any number and in any combination that is not logically or technically inconsistent.

EEE 1 is an abrasive article comprising: an open cell foam body; an abrasive composition disposed homogenously throughout the open cell foam body, the abrasive composition comprising: a resin and a plurality of abrasive particles, wherein each particle has a hardness of at least 6 on a Mohs scale, wherein the abrasive article has an effective grit dependent on a pressure applied to the article.

EEE 2 is the abrasive article of EEE 1, wherein the open cell foam body has a density of at least 6 kg/m$^3$ (e.g., at least 8 kg/m$^3$, or at least 10 kg/m$^3$).

EEE 3 is the abrasive article of EEE 1, wherein the open cell foam body has a density in a range of 6 to 16 kg/m$^2$ (e.g., in the range of 8 to 16 kg/m$^3$, or 10 to 16 kg/m$^3$, or 12 to 16 kg/m$^3$).

EEE 4 is the abrasive article of EEE 1, wherein the open cell foam body has a density of at least 16 kg/m$^3$ (e.g., at least 18 kg/m$^3$, or at least 20 kg/m$^3$).

EEE 5 is the abrasive article of EEE 1, wherein the open cell foam body has a density in the range of 16 to 48 kg/m$^2$ (e.g., in the range of 24 to 48 kg/m$^3$, or 30 to 48 kg/m$^3$, or 36 to 48 kg/m$^3$, or 42 to 48 kg/m$^3$).

EEE 6 is the abrasive article of EEE 1, wherein the open cell foam body has a density of at least 48 kg/m$^3$ (e.g., at least 52 kg/m$^3$, or at least 58 kg/m$^3$, or at least 64 kg/m$^3$).

EEE 7 is the abrasive article of EEE 1, wherein the open cell foam body has a density in the range of 48 to 72 kg/m$^2$ (e.g., in the range of 52 to 72 kg/m$^3$, or 58 to 72 kg/m$^3$, or 64 to 72 kg/m$^3$).

EEE 8 is the abrasive article of EEE 1, wherein the open cell foam body comprises polyester, polyurethane, polyether, melamine, or combination thereof.

EEE 9 is the abrasive article of EEE 8, wherein the open cell foam body comprises at least 50 wt % polyester (e.g., at least 60 wt %, at least 70 wt %, or at least 75 wt %), based on the weight of the open cell body.

EEE 10 is the abrasive article of EEE 8, wherein the open cell foam body comprises at least 90 wt % polyester (e.g., at least 95 wt %, or at least 98 wt %, or at least 99 wt %), based on the weight of the open cell foam body.

EEE 11 is the abrasive article of EEE 8, wherein the open cell foam body comprises at least 50 wt % polyurethane (e.g., at least 60 wt %, at least 70 wt %, or at least 75 wt %), based on the weight of the open cell body.

EEE 12 is the abrasive article of EEE 8, wherein the open cell foam body comprises at least 90 wt % polyurethane (e.g., at least 95 wt %, or at least 98 wt %, or at least 99 wt %), based on the weight of the open cell foam body.

EEE 13 is the abrasive article of EEE 8, wherein the open cell foam body comprises at least 50 wt % polyether (e.g., at least 60 wt %, at least 70 wt %, or at least 75 wt %), based on the weight of the open cell body EEE 14 is the abrasive article of EEE 8, wherein the open cell foam body comprises at least 90 wt % polyether (e.g., at least 95 wt %, or at least 98 wt %, or at least 99 wt %), based on the weight of the open cell foam body.

EEE 15 is the abrasive article of EEE 8, wherein the open cell foam body comprises at least 50 wt % melamine (e.g., at least 60 wt %, at least 70 wt %, or at least 75 wt %), based on the weight of the open cell body EEE 16 is the abrasive article of EEE 8, wherein the open cell foam body comprises at least 90 wt % melamine (e.g., at least 95 wt %, or at least 98 wt %, or at least 99 wt %), based on the weight of the open cell foam body.

EEE 17 is the abrasive article of EEE 1, wherein the abrasive composition is disposed homogenously throughout at least 75% (e.g., at least 80%, or at least 85%, or at least 90%) of the open cell foam body.

EEE 18 is the abrasive article of EEE 1, wherein the abrasive composition is disposed homogenously throughout at least 95% (e.g., at least 97%, or at least 98%, or at least 99%) of the open cell foam body.

EEE 19 is the abrasive article of EEE 1, wherein the abrasive composition is disposed homogenously on an open cell structure of the open cell foam body.

EEE 20 is the abrasive article of EEE 19, wherein the abrasive composition is disposed homogenously on at least 75% (e.g., at least 80%, or at least 85%, or at least 90%) of the open cell structure.

EEE 21 is the abrasive article of EEE 19, wherein the abrasive composition is disposed homogenously on at least 95% (e.g., at least 97%, or at least 98%, or at least 99%) of the open cell structure.

EEE 22 is the abrasive article of EEE 1, wherein the resin is selected from a natural resin or a synthetic resin.

EEE 23 is the abrasive article of EEE 22, wherein the natural resin is selected from shellac, copal, dammar, mastic, sandarac, pitch, or combinations thereof.

EEE 24 is the abrasive article of EEE 22, wherein the natural resin is shellac.

EEE 25 is the abrasive article of EEE 22, wherein the synthetic resin is selected from silicone resins, epoxy resins, polyurethane resins, or UV-curable resins.

EEE 26 is the abrasive article of EEE 1, wherein the resin is present in the abrasive article in an amount of at least 10 g/in$^3$ (e.g., at least 12 g/in$^3$, or at least 15 g/in$^3$), based on the volume of the abrasive article.

EEE 27 is the abrasive article of EEE 1, wherein the resin is present in the abrasive article in an amount in the range of 10-30 g/in$^3$ (e.g., in the range of 10-28 g/in$^3$, or 10-25 g/in$^3$, or 12-30 g/in$^3$, or 12-28 g/in$^3$, or 12-25 g/in$^3$, or 15-30 g/in$^3$, or 15-28 g/in$^3$, or 15-25 g/in$^3$), based on the volume of the abrasive article.

EEE 28 is the abrasive article of EEE 1, wherein each particle has a hardness of at least 6.5 (e.g., at least 7, at least 7.5, at least 8, at least 8.5, or at least 9) on the Mohs scale.

EEE 29 is the abrasive article of EEE 1, wherein each particle has a hardness in the range of 6 to 10 (e.g., in the range of 6.5 to 10, or 7 to 10, or 7.5 to 10, or 8 to 10, or 8.5, or 9 to 10), on the Mohs scale.

EEE 30 is the abrasive article of EEE 1, wherein each particle is individually selected from flintstone, aluminum oxide, silicon carbide, cubic boron nitride (cBN), zirconium dioxide, cerium oxide, diamond, or combinations thereof.

EEE 31 is the abrasive article of EEE 1, wherein the plurality of abrasive particles comprise at least one particle selected from flintstone, aluminum oxide, silicon carbide, cBN, zirconium dioxide, cerium dioxide, or diamond.

EEE 32 is the abrasive article of EEE 1, wherein the plurality of abrasive particles comprise at least 50 wt % (e.g., at least 65 wt %, or 70 wt %, or 75 wt %, or 80 wt %) flintstone, based on the weight of the plurality.

EEE 33 is the abrasive article of EEE 1, wherein the plurality of abrasive particles comprise at least 90 wt % (e.g., at least 95 wt %, or 97 wt %, or 98 wt %, or 99 wt %) flintstone, based on the weight of the plurality.

EEE 34 is the abrasive article of EEE 1, wherein the plurality of abrasive particles comprise at least 50 wt % (e.g., at least 65 wt %, or 70 wt %, or 75 wt %, or 80 wt %) aluminum oxide, based on the weight of the plurality.

EEE 35 is the abrasive article of EEE 1, wherein the plurality of abrasive particles comprise at least 90 wt % (e.g., at least 95 wt %, or 97 wt %, or 98 wt %, or 99 wt %) aluminum oxide, based on the weight of the plurality.

EEE 36 is the abrasive article of EEE 1, wherein the plurality of abrasive particles comprise at least 50 wt % (e.g., at least 65 wt %, or 70 wt %, or 75 wt %, or 80 wt %) silicone carbine, based on the weight of the plurality.

EEE 37 is the abrasive article of EEE 1, wherein the plurality of abrasive particles comprise at least 90 wt % (e.g., at least 95 wt %, or 97 wt %, or 98 wt %, or 99 wt %) silicon carbine, based on the weight of the plurality.

EEE 38 is the abrasive article of EEE 1, wherein the plurality of abrasive particles comprise at least 90 wt % (e.g., at least 95 wt %, or 97 wt %, or 98 wt %, or 99 wt %) CBN, based on the weight of the plurality.

EEE 39 is the abrasive article of EEE 1, wherein the plurality of abrasive particles comprise at least 50 wt % (e.g., at least 65 wt %, or 70 wt %, or 75 wt %, or 80 wt %) cBN, based on the weight of the plurality.

EEE 40 is the abrasive article of EEE 1, wherein the plurality of abrasive particles comprise at least 90 wt % (e.g., at least 95 wt %, or 97 wt %, or 98 wt %, or 99 wt %) zirconium dioxide, based on the weight of the plurality.

EEE 41 is the abrasive article of EEE 1, wherein the plurality of abrasive particles comprise at least 50 wt % (e.g., at least 65 wt %, or 70 wt %, or 75 wt %, or 80 wt %) zirconium dioxide, based on the weight of the plurality.

EEE 42 is the abrasive article of EEE 1, wherein the plurality of abrasive particles comprise at least 90 wt % (e.g., at least 95 wt %, or 97 wt %, or 98 wt %, or 99 wt %) cerium oxide, based on the weight of the plurality.

EEE 43 is the abrasive article of EEE 1, wherein the plurality of abrasive particles comprise at least 50 wt % (e.g., at least 65 wt %, or 70 wt %, or 75 wt %, or 80 wt %) cerium oxide, based on the weight of the plurality.

EEE 44 is the abrasive article of EEE 1, wherein the plurality of abrasive particles comprise at least 50 wt % (e.g., at least 65 wt %, or 70 wt %, or 75 wt %, or 80 wt %) diamond particles (e.g., diamond dust), based on the weight of the plurality.

EEE 45 is the abrasive article of EEE 1 wherein the plurality of abrasive particles comprise at least 90 wt % (e.g., at least 95 wt %, or 97 wt %, or 98 wt %, or 99 wt %) diamond particles (e.g., diamond dust), based on the weight of the plurality.

EEE 46 is the abrasive article of EEE 1, wherein the plurality of abrasive particles has a unimodal particle size distribution.

EEE 47 is the abrasive article of EEE 46, wherein the plurality of abrasive particles have a $d_{50}$ particle size of at least 0.1 μm (e.g., at least 0.25 μm, at least 0.5 μm, or 1 μm, at least 5 μm, or at least 10 μm).

EEE 48 is the abrasive article of EEE 46, wherein the plurality of abrasive particles have a $d_{50}$ particle size in the range of 0.1 μm to 100 μm (e.g., 0.1 μm to 80 μm, or 0.1 μm to 60 μm, or 1 μm to 100 μm, or 1 μm to 80 μm, or 1 μm to 60 μm, or 10 to 100 μm, or 10 to 80 μm, or 10 to 60 μm, or 20 to 100 μm, or 20 to 80 μm, or 20 to 60 μm, or 40 to 100 μm, or 40 to 80 μm, or 40 to 60 μm).

EEE 49 is the abrasive article of EEE 46, wherein the plurality of abrasive particles have a $d_{10}$ particle size of at least 0.1 μm (e.g., at least 0.25 μm, at least 0.5 μm, at least 1 μm, at least 5 μm, or at least 10 μm).

EEE 50 is the abrasive article of EEE 46, wherein the plurality of abrasive particles have a $d_{90}$ particle size of no more than 1000 μm (e.g., no more than 500 μm, no more than 250 μm, or no more than 100 μm).

EEE 51 is the abrasive article of EEE 1, wherein the plurality of abrasive particles has a bimodal particle size distribution (e.g., a first do particle size and a second $d_{50}$ particle size).

EEE 52 is the abrasive article of EEE 51, wherein the first $d_{50}$ particle size is greater than the second $d_{50}$ particle size.

EEE 53 is the abrasive article of EEE 51, wherein the plurality of abrasive particles have a first $d_{50}$ particle size of at least 1 μm (e.g., at least 5 μm, at lesat 10 μm, at least 15 μm, or at least 20 μm) and the second $d_{50}$ particle size of at least 0.1 μm (e.g., at least 0.25 μm, at least 0.5 μm, at least 1 μm, at least 5 μm, or at least 10 μm).

EEE 54 is the abrasive article of EEE 51, wherein the plurality of abrasive particles have a first $d_{50}$ particle size in the range of 0.1 μm to 100 μm (e.g., 0.1 μm to 80 μm, or 0.1 μm to 60 μm, or 1 μm to 100 μm, 1 μm to 80 μm, or 1 μm to 60 μm, or 10 to 100 μm, or 10 to 80 μm, or 10 to 60 μm, or 20 to 100 μm, or 20 to 80 μm, or 20 to 60 μm, or 40 to 100 μm, or 40 to 80 μm, or 40 to 60 μm) and a second $d_{50}$ particle size in the range of 0.1 μm to 100 μm (e.g., 0.1 μm to 80 μm, or 0.1 μm to 60 μm, or 1 μm to 100 μm, 1 μm to 80 μm, or 1 μm to 60 μm, or 10 to 100 μm, or 10 to 80 μm, or 10 to 60 μm, or 20 to 100 μm, or 20 to 80 μm, or 20 to 60 μm, or 40 to 100 μm, or 40 to 80 μm, or 40 to 60 μm), wherein the first $d_{50}$ particle size is greater than the second $d_{50}$ particle size.

EEE 55 is the abrasive article of EEE 1, wherein the plurality of abrasive particles has a multimodal size distribution (e.g., at least two $d_{50}$ particle sizes).

EEE 56 is the abrasive article of EEE 1, wherein the plurality of abrasive particles is present in the abrasive article in an amount of at least 0.1 g/in$^3$ (e.g., at least 0.25 g/in$^3$, at least 0.5 g/in$^3$, or at least 1.0 g/in$^3$, at least 1.5 g/in$^3$), based on the volume of the abrasive article.

EEE 57 is the abrasive article of EEE 1, wherein the plurality of abrasive particles is present in the abrasive article in an amount in the range of 0.2-2.5 g/in$^3$ (e.g., in the range of 0.2-2.5 g/in$^3$, or 0.2-2.0 g/in$^3$, or 0.2-1.5 g/in$^3$, 0.5-2.5 g/in$^3$, or 0.5-2.0 g/in$^3$, or 0.5-1.5 g/in$^3$, or 1.0-2.5 g/in$^3$, or 1.0-2.0 g/in$^3$, or 1.0-1.5 g/in$^3$).

EEE 58 is the abrasive article of EEE 1, wherein the resin and plurality of abrasive particles are present in the abrasive composition in a ratio of at least 300:1 (e.g., at least 250:1, or at least 200:1, or at least 150:1, or at least 120:1, or at least 100:1).

EEE 59 is the abrasive article of EEE 1, wherein the resin and plurality of abrasive particles are present in the abrasive composition in a ratio of at most 1:1 (e.g., at most 2:1, or at most 4:1).

EEE 60 is the abrasive article of EEE 1, wherein the resin and plurality of abrasive particles are present in the abrasive composition in a ratio is in the range of 300:1 to 1:1 (e.g., in the range of 150:1 to 1:1, or 120:1 to 1:1, or 100:1 to 1:1, or 50:1 to 1:1, or 20:1 to 1:1, or 15:1 to 1:1, or 12:1 to 1:1, to 5:1 to 1:1, or 300:1 to 2:1, or 150:1 to 2:1, or 120:1 to 2:1, or 100:1 to 2:1, or 50:1 to 2:1, or 20:1 to 2:1, or 15:1 to 2:1, or 12:1 to 2:1, to 5:1 to 2:1, or 300:1 to 4:1, or 150:1 to 4:1, or 120:1 to 4:1, or 100:1 to 4:1, or 50:1 to 4:1, or 20:1 to 4:1, or 15:1 to 4:1, or 12:1 to 4:1, to 5:1 to 4:1).

EEE 61 is the abrasive article of EEE 1 having an average grit of at least 100,000 grit (e.g., at least 80,000 grit, at least 60,000 grit, or at least 40,000 grit).

EEE 62 is the abrasive article of EEE 1 having an average grit of no more than 300 grit (e.g. no more than 400 grit, or 500 grit, or 600 grit).

EEE 63 is the abrasive article of EEE 1 having an average grit in the range of 2000-8000 grit (e.g., in the range of 2000-7500 grit, or 2000-7000 grit, or 2000-6500 grit, or 2500-8000 grit, or 2500-7500 grit, or 2500-7000 grit, or 2500-6500 grit, or 3000-8000-grit, or 3000-7500 grit, or 3000-7000 grit, or 3000-6500 grit, or 3500-8000 grit, or 3500-7500 grit, or 3500-7000 grit, or 3500-6500 grit).

EEE 64 is the abrasive article of EEE 1, wherein the effective grit (e.g., grit number) is lower than the average grit (e.g., grit number) when a pressure of greater than 3.75 kPa (e.g., in the range of 3.75 kPa to 5.5 kPa) is applied.

EEE 65 is the abrasive article of EEE 1, wherein the effective grit (e.g., grit number) is at least 5% (e.g., at least 10%, or at least 15%, or at least 20%) lower than the average grit (e.g., grit number) when a pressure of greater than 3.75 kPa (e.g., in the range of 3.75 kPa to 5.5 kPa) is applied.

EEE 66 is the abrasive article of EEE 1, wherein the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) lower than the average grit (e.g., grit number) when a pressure of greater than 3.75 kPa (e.g., in the range of 3.75 kPa to 5.5 kPa) is applied.

EEE 67 is the abrasive article of EEE 1, wherein the effect grit is at least 600 grit (e.g., at least 400 grit, or at least 300 grit) when a pressure of greater than 3.75 kPa (e.g., in the range of 3.75 kPa to 5.5 kPa) is applied.

EEE 68 is the abrasive article of EEE 1, wherein the effective grit (e.g., grit number) is greater than the average grit when a pressure of less than 3.75 kPa (e.g., in the range of 2 kPa to 3.75 kPa) is applied.

EEE 69 is the abrasive article of EEE 1, wherein the effective grit (e.g., grit number) is at least 5% (e.g., at least 10 wt %, or at least 15 wt %, or at least 20 wt %) greater than the average grit (e.g., grit number) when a pressure of less than 3.75 kPa (e.g., in the range of 2 kPa to 3.75 kPa) is applied.

EEE 70 is the abrasive article of EEE 1, wherein the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) greater than the average grit (e.g., grit number) when a pressure of less than 3.75 kPa (e.g., in the range of 2 kPa to 3.75 kPa) is applied.

EEE 71 is the abrasive article of EEE 1, wherein the effect grit is at least 10,000 grit (e.g., at least 8000 grit, at least 6000 grit, or at least 4000 grit) when a pressure of less than 3.75 kPa (e.g., in the range of 2 kPa to 3.75 kPa) is applied.

EEE 72 is the abrasive article of EEE 1, wherein the abrasive article has a thickness of at least 0.5 mm (e.g., at least 1 mm, or at least 2 mm).

EEE 73 is the abrasive article of EEE 1, wherein the abrasive article has a thickness in the range of 1 to 125 mm (e.g., in the range of 1 to 100 mm, or 1 to 75 mm, or 1 to 50 mm, or 10 to 125 mm, or 10 to 100 mm, or 10 to 75 mm, or 10 to 50 mm, or 10 to 25 mm, or 25 to 125 mm, or 25 to 100 mm, or 25 to 75 mm, or 25 to 50 mm)

EEE 74 is the abrasive article of EEE 1, wherein the abrasive article has a thickness in the range of 1 to 10 mm (e.g., in the range of 1 to 8 mm, or 1 to 6 mm, or 2 to 10 mm, or 2 to 8 mm, or 2 to 6 mm).

EEE 75 is a method of making an abrasive article (e.g., of any of EEEs 1 to 74), the method comprising: providing an open cell foam body; providing a liquid comprising a solvent and an abrasive composition, wherein the abrasive composition comprises: a resin; and a plurality of abrasive particles, wherein each particle has a hardness of at least 6 on the Mohs scale; contacting the open cell foam body with the liquid to provide a damp open cell foam body; and applying a pressure across the damp open cell foam body; and allowing the liquid to dry by evaporation of the solvent to provide the abrasive article; wherein the abrasive composition is disposed homogeneously throughout the open cell foam body; wherein the abrasive article has an effective grit dependent on a pressure applied to the article.

EEE 76 is the method of EEE 75, wherein the open cell foam body is as described in any of EEEs 2 to 16.

EEE 77 is the method of EEE 75, wherein the abrasive composition is as described in any of EEEs 17 to 21.

EEE 78 is the method of EEE 75, wherein the resin is as described in any of EEEs 22 to 27.

EEE 79 is the method of EEE 75, wherein the plurality of abrasive particles is as described in any of EEEs 28 to 57.

EEE 80 is the method of EEE 75, wherein the abrasive articles is as described in any of EEEs 58 to 74.

EEE 81 is the method of EEE 75, wherein the liquid comprises the resin and the solvent in a weight ratio of at least 4:1 (e.g., at least 6:1, at least 8:1, at least 10:1, or at least 12:1).

EEE 82 is the method of EEE 75, wherein the liquid comprises the resin and the solvent in a weight ratio in the range of 4:1 to 16:1 (e.g., in the range of 4:1 to 14:1, or 4:1 to 12:1, or 6:1 to 14:1, or 6:1 to 16:1, or 6:1 to 14:1, or 6:1 to 12:1, or 8:1 to 16:1, or 8:1 to 14:1, or 8:1 to 12:1).

EEE 83 is the method of EEE 75, wherein the liquid comprises the solvent and the plurality of abrasive particles in a ratio of at least 1:1 mL/g (e.g., at least 1.5:1, at least 2:1, or at least 2.5:1 mL/g).

EEE 84 is the method of EEE 75, wherein the liquid comprises the solvent and the plurality of abrasive particles in a ratio in the range of 1:1 to 40:1 mL/g (e.g., in the range of 1:1 to 36:1, or 1:1 to 32:1, or 1:1 to 28:1, or 1:1 to 24:1, or 1.5:1 to 40:1, or 1.5:1 to 36:1, or 1.5:1 to 32:1, or 1.5:1 to 28:1, or 1.5:1 to 24:1, 2:1 to 40:1, or 2:1 to 36:1, or 2:1 to 32:1, or 2:1 to 28:1, or 2:1 to 24:1, or 2.5:1 to 40:1, or 2.5:1 to 36:1, or 2.5:1 to 32:1, or 2.5:1 to 28:1, or 2.5:1 to 24:1 mL/g)

EEE 85 is the method of EEE 75, wherein the solvent is selected from methanol, ethanol, propanol, or butanol.

EEE 86 is the method of EEE 75, wherein contacting the open cell foam body with the liquid saturates the open cell foam body.

EEE 86 is the method of EEE 75, wherein contacting the open cell foam body with the liquid comprises spraying, coating, or dunking the open cell foam body with (in) the liquid.

EEE 87 is the method of EEE 75, wherein the pressure applied is at least 1 MPa.

EEE 88 is the method of EEE 75, wherein the pressure applied is no more than 4 MPa.

EEE 89 is the method of EEE 75, wherein the pressure applied is in a range of 1-4 MPa (e.g., in the range of 1-3.5 MPa, or 1-3.2 MPa, or 1.2-4 MPa, or 1.2-3.5 MPa, or 1.2-3.2 MPa).

EEE 90 is the method of EEE 75, wherein the pressure is applied uniformly across the open cell foam body.

EEE 91 is the method of EEE 75, wherein allowing the liquid to dry by evaporation of the solvent is conducted at room temperature.

EEE 92 is the method of EEE 75, wherein allowing the liquid to dry by evaporation of the solvent is conducted at an elevated temperature.

EEE 93 is the method of EEE 92, wherein the elevated temperature is at least 50° C. (e.g., at least 60° C., or at least 70° C.).

EEE 94 is a method of texturing a surface comprising: contacting the abrasive article of any of EEEs 1 to 74 with the surface at a pressure and for a time sufficient to texture the surface, wherein the article has an effective grit depending on the pressure.

EEE 95 is the method of EEE 94, wherein the surface is selected from a metal surface, a stone surface, a polymer surface, a laminate surface, a glass surface, or a wood surface.

EEE 96 is the method of EEE 94, wherein contacting the abrasive article is conducted at a pressure of greater than 3.75 kPa (e.g., in the range of 3.75 to 5.5 kPa) provides the abrasive article an effective grit (e.g., grit number) that is lower than the average grit (e.g., grit number).

EEE 97 is the method of EEE 96, wherein the effective grit (e.g., grit number) is at least 5% (e.g., at least 10%, or at least 15%, or at least 20%) lower than the average grit (e.g., grit number) when a pressure of greater than 3.75 kPa (e.g., in the range of 3.75 to 5.5 kPa) is applied.

EEE 98 is the method of EEE 96, wherein the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) lower than the average grit (e.g., grit number) when a pressure of greater than 3.75 kPa (e.g., in the range of 3.75 to 5.5 kPa) is applied.

EEE 99 is the method of EEE 96, wherein the effective grit is at least 600 grit (e.g., at least 400 grit, or at least 300 grit) when a pressure of greater than 3.75 kPa (e.g., in the range of 3.75 to 5.5 kPa) is applied.

EEE 100 is the method of EEE 94, wherein contacting the abrasive article is conducted at a pressure of less than 3.75 kPa (e.g., in the range of 2 to 3.75 kPa) provides the abrasive article an effective grit (e.g., grit number) that is greater than the average grit (e.g., grit number).

EEE 101 is the method of EEE 100, wherein the effective grit (e.g., grit number) is at least 5% (e.g., at least 10 wt %, or at least 15 wt %, or at least 20 wt %) greater than the average grit (e.g., grit number) when a pressure of less than 3.75 kPa (e.g., in the range of 2 to 3.75 kPa) is applied.

EEE 102 is the method of EEE 100, wherein the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) greater than the average grit (e.g., grit number) when a pressure of less than 3.75 kPa (e.g., in the range of 2 to 3.75 kPa) is applied.

EEE 103 is the method of EEE 100, wherein the effect grit is at least 10,000 grit (e.g., at least 8000 grit, at least 6000 grit, or at least 4000 grit) when a pressure of less than 3.75 kPa (e.g., in the range of 2 to 3.75 kPa) is applied.

EEE 104 is a method of polishing a surface comprising: contacting the abrasive article of any of EEEs 1 to 74 with the surface at a pressure and for a time sufficient to polish the surface, wherein the article has an effective grit depending on the pressure.

EEE 105 is the method of EEE 104, wherein the surface is selected from a metal surface, a stone surface, a laminate surface, a polymer surface, or a glass surface.

EEE 106 is the method of EEE 104, wherein contacting the abrasive article is conducted at a pressure of greater than 3.75 kPa (e.g., in the range of 3.75 to 5.5 kPa) provides the abrasive article an effective grit (e.g., grit number) that is lower than the average grit (e.g., grit number).

EEE 107 is the method of EEE 106, wherein the effective grit (e.g., grit number) is at least 5% (e.g., at least 10%, or at least 15%, or at least 20%) lower than the average grit (e.g., grit number) when a pressure of greater than 3.75 kPa (e.g., in the range of 3.75 to 5.5 kPa) is applied.

EEE 108 is the method of EEE 106, wherein the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) lower than the average grit (e.g., grit number) when a pressure of greater than 3.75 kPa (e.g., in the range of 3.75 to 5.5 kPa) is applied.

EEE 109 is the method of EEE 106, wherein the effect grit is at least 600 grit (e.g., at least 400 grit, or at least 300 grit) when a pressure of greater than 3.75 kPa (e.g., in the range of 3.75 to 5.5 kPa) is applied.

EEE 110 is the method of EEE 104, wherein contacting the abrasive article is conducted at a pressure of less than 3.75 kPa (e.g., in the range of 2 to 3.74 kPa) provides the abrasive article an effective grit (e.g., grit number) that is greater than the average grit (e.g., grit number).

EEE 111 is the method of EEE 110, wherein the effective grit (e.g., grit number) is at least 5% (e.g., at least 10 wt %, or at least 15 wt %, or at least 20 wt %) greater than the average grit (e.g., grit number) when a pressure of less than 3.75 kPa (e.g., in the range of 2 to 3.74 kPa) is applied.

EEE 112 is the method of EEE 110, wherein the effective grit (e.g., grit number) is in the range of 5-50% (e.g., in the range of 5-40%, or 5-30%, or 5-20%, or 10-50%, or 10-40%, or 10-30%, or 20-50%, or 20-40%, or 20-30%) greater than the average grit (e.g., grit number) when a pressure of less than 3.75 kPa (e.g., in the range of 2 to 3.74 kPa) is applied.

EEE 113 is the method of EEE 110, wherein the effect grit is at least 10,000 grit (e.g., at least 8000 grit, at least 6000 grit, or at least 4000 grit) when a pressure of less than 3.75 kPa (e.g., in the range of 2 to 3.74 kPa) is applied.

EEE 114 is a machine for texturing or polishing a surface comprising the abrasive article of any of EEEs 1 to 74.

The particulars shown herein are by way of example and for purposes of illustrative discussion of the preferred embodiments and are presented in the cause of providing what is believed to be the most useful and readily understood description of the principles and conceptual aspects of various embodiments. In this regard, no attempt is made to show structural details of in more detail than is necessary for the fundamental understanding, the description taken with the drawings and/or examples making apparent to those skilled in the art how the several forms may be embodied in practice. Thus, before the disclosed processes and devices are described, it is to be understood that the aspects described herein are not limited to specific embodiments, apparatuses, or configurations, and as such can, of course, vary. It is also to be understood that the terminology used herein is for the purpose of describing particular aspects only and, unless specifically defined herein, is not intended to be limiting.

The terms "a," "an," "the" and similar referents used in the context of describing disclosed embodiments (especially in the context of the following claims) are to be construed to cover both the singular and the plural, unless otherwise indicated herein or clearly contradicted by context. Recitation of ranges of values herein is merely intended to serve as a shorthand process of referring individually to each separate value falling within the range. Unless otherwise indicated herein, each individual value is incorporated into the specification as if it were individually recited herein. It will be further understood that the endpoints of each of the ranges are significant both in relation to the other endpoint, and independently of the other endpoint.

All processes described herein can be performed in any suitable order of steps unless otherwise indicated herein or otherwise clearly contradicted by context. The use of any and all examples, or exemplary language (e.g., "such as") provided herein is intended merely to better illuminate examples and does not pose a limitation on the scope of example embodiments otherwise claimed. No language in the specification should be construed as indicating any non-claimed element essential to the practice of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

Unless indicated to the contrary, the numerical parameters set forth in the specification and attached claims are approximations that may vary depending upon the desired properties sought to be obtained by disclosed embodiments. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Furthermore, it is to be understood that the embodiments of the invention disclosed herein are illustrative of the principles of the present Examples). Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

I claim:

1. An abrasive article comprising:

an open cell foam body; and an abrasive composition disposed homogenously throughout the open cell foam body, wherein the abrasive composition comprises a resin and a plurality of abrasive particles, wherein each abrasive particle has a hardness above a threshold hardness level;

wherein the abrasive article has a pressure dependent effective grit and a pressure independent average grit wherein the pressure dependent effective grit is lower than the average grit at a pressure of greater than 3.75 kPa and wherein the pressure dependent effective grit is greater than the average grit at a pressure of less than 3.75 kPa.

2. The abrasive article of claim 1, wherein the threshold hardness level corresponds to a hardness of at least six (6) on a Mohs scale.

3. The abrasive article of claim 1, wherein the open cell foam body is selected from a low density open cell foam, a medium density open cell foam, or a high density open cell foam.

4. The abrasive article of claim 1, wherein the open cell foam body has a density in the range of 48 to 72 kilogram per cubic meter ($kg/m^3$).

5. The abrasive article of claim 1, wherein the open cell foam body comprises polyester, polyurethane, polyether, melamine, or combination thereof.

6. The abrasive article of claim 5, wherein the open cell foam body comprises at least 50 wt % melamine, based on the weight of the open cell body.

7. The abrasive article of claim 5, wherein the open cell foam body comprises at least 90 wt % melamine, based on the weight of the open cell foam body.

8. The abrasive article of claim 1, wherein the abrasive composition is disposed homogenously throughout at least 95% of the open cell foam body.

9. The abrasive article of claim 1, wherein the resin is a natural resin selected from shellac, copal, dammar, mastic, sandarac, pitch, or combinations thereof.

10. The abrasive article of claim 1, wherein the resin is present in the abrasive article in an amount of at least 10 grams per cubic inch ($g/in^3$), based on the volume of the abrasive article.

11. The abrasive article of claim 1, wherein each abrasive particle has a hardness of at least 8 on a Mohs scale.

12. The abrasive article of claim 1, wherein each abrasive particle is individually selected from flintstone, aluminum oxide, silicon carbide, cubic boron nitride (cBN), zirconium dioxide, cerium oxide, or diamond.

13. The abrasive article of claim 1, wherein the plurality of abrasive particles comprise at least 50 wt % diamond particles, based on the weight of the plurality.

14. The abrasive article of claim 1, wherein the plurality of abrasive particles comprise at least 90 wt % diamond particles, based on the weight of the plurality.

15. The abrasive article of claim 1, wherein the plurality of abrasive particles have a $d_{50}$ particle size of at least 0.1 micrometer (μm).

16. The abrasive article of claim 1, wherein the average girt of the abrasive article is at least 100,000 grit number.

17. The abrasive article of claim 1, having an average grit in the range of 300-8000 grit.

* * * * *